Figure 1:
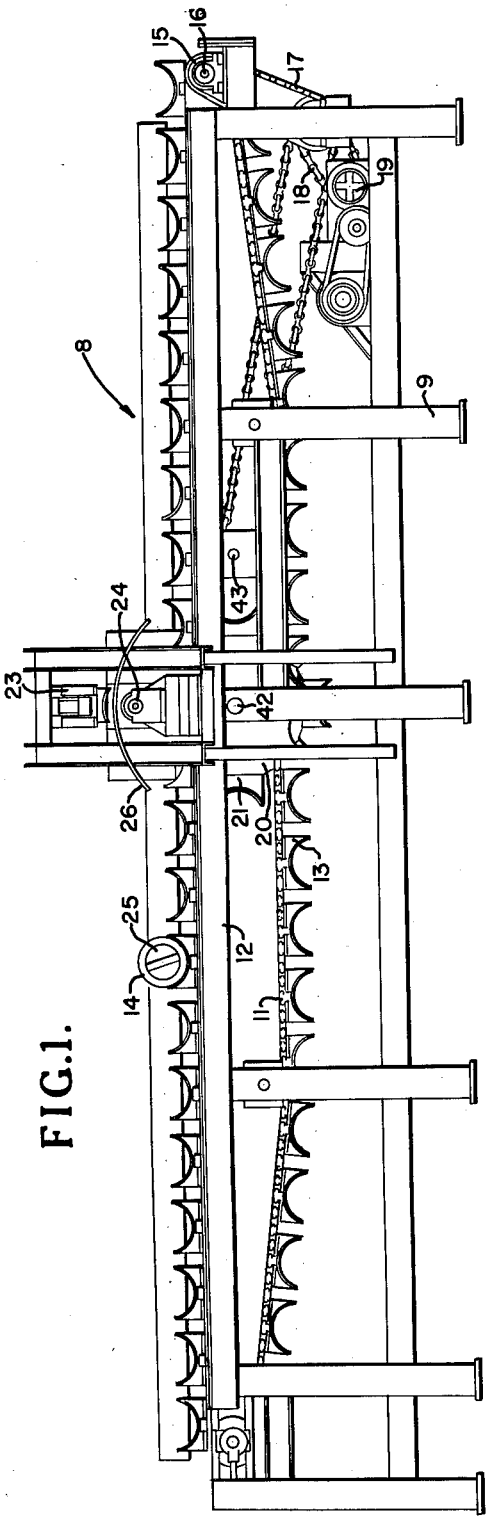

March 27, 1962 H. F. LARGEN ET AL 3,026,662
CARTRIDGE TANK CRADLE CONVEYOR
Filed June 30, 1960 2 Sheets-Sheet 1

INVENTORS.
HAROLD F. LARGEN
CHARLES M. WEIR
BY
ATTYS.

March 27, 1962   H. F. LARGEN ET AL   3,026,662
CARTRIDGE TANK CRADLE CONVEYOR
Filed June 30, 1960   2 Sheets-Sheet 2

INVENTORS.
HAROLD F. LARGEN
CHARLES M. WEIR
BY
W. O. Dusenberry
O. P. Hodges
ATTYS.

United States Patent Office 3,026,662
Patented Mar. 27, 1962

3,026,662
CARTRIDGE TANK CRADLE CONVEYOR
Harold F. Largen, Washington, and Charles M. Weir, Mitchell, Ind., assignors to the United States of America as represented by the Secretary of the Navy
Filed June 30, 1960, Ser. No. 40,113
6 Claims. (Cl. 53—331.5)
(Granted under Title 35, U.S. Code (1952), sec. 266)

The invention described herein may be manufactured and used by or for the Government of the United States of America for governmental purposes without the payment of any royalties thereon or therefor.

This invention relates in general to a conveyor operation and more specifically to a conveyor for performing an operation upon articles and has particular reference to a transfer mechanism for removing the articles in succession from a continuously moving conveyor and for transferring them into a work station and thence returning them to the continuously moving conveyor while maintaining the articles in a predetermined spaced and time sequence.

Heretofore it has been common practice for each man to manually move ammunition tubes from one station to the next on the tanking table while assembling the ammunition in the tubes. At the end of the assembly operation the tubes are mechanically clamped in position while the lids are placed on the tubes and tightened by hand. This type of operation was found to be inefficient and requiring more personnel to operate. Rolling the tubes from station to station by hand caused the workman to become fatigued and resulted in a sporadic pacing of the assembly line. As a result of tightening the cover by hand the torque applied to each cover varied from tube to tube depending on the strength of the operator. This being undesirable because if too much torque is applied it becomes most difficult to remove the cover and if too little torque is applied, the cover may be lost while transporting the tube to the destination.

Applicants have invented a conveyor system which clearly overcomes the disadvantages of the prior art systems. Applicants' invention utilizes, for example, a cradle-conveyor to transport cartridge container tanks in a straight line along an assembly line at a fixed rate of speed. The persons along the assembly line insert the rounds of ammunition, spacers and lids in the desired order in the containers. The cover tightening station pneumatically torques each cover on the container in a uniform manner.

It is therefore an object of this invention to provide a continuously moving conveyor with a variable drive for providing a uniformly paced conveyor line.

It is another object to provide a constant speed conveyor having a device for automatically tightening the lids on tubes without stopping the conveyor.

It is another object to provide a device for performing an operation upon articles in a transfer mechanism and for transferring the articles into a work station, the articles passing through the machine in a continuously advancing procession in timed order to facilitate high speed production.

Still another object is the provision of such a transfer mechanism with each working station so as to remove each article from a continuously moving supply of articles in a timed sequence and allowing each station sufficient time to fully effect a desired operation upon each article.

It is a further object to provide a new and improved mechanism synchronized with a constant speed conveyor for removing a device from the conveyor index into a clamped position for an operation to be performed thereon and then index it back onto the conveyor in its original position.

Still another object is to provide a new and improved mechanism forming a work station on a constant speed continuously moving conveyor line.

Figure 3:
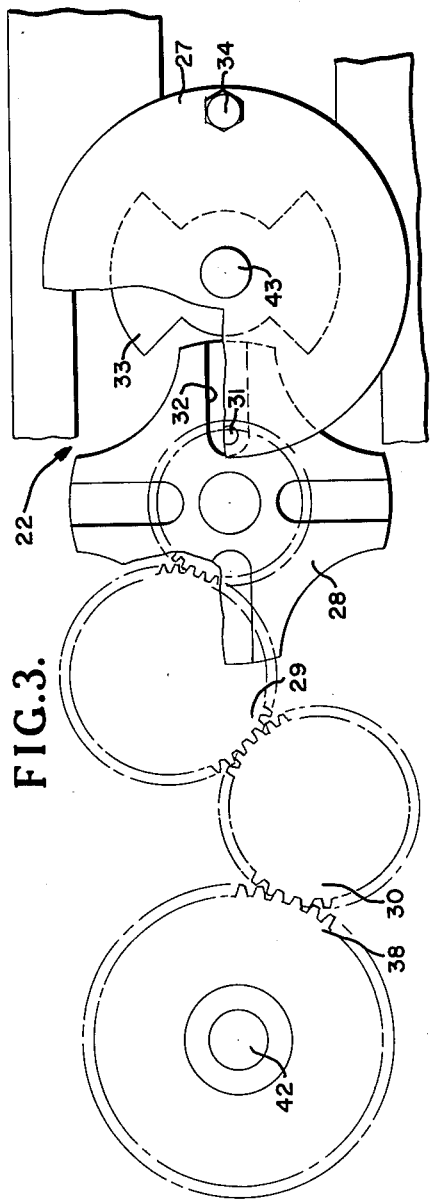
Figure 2:
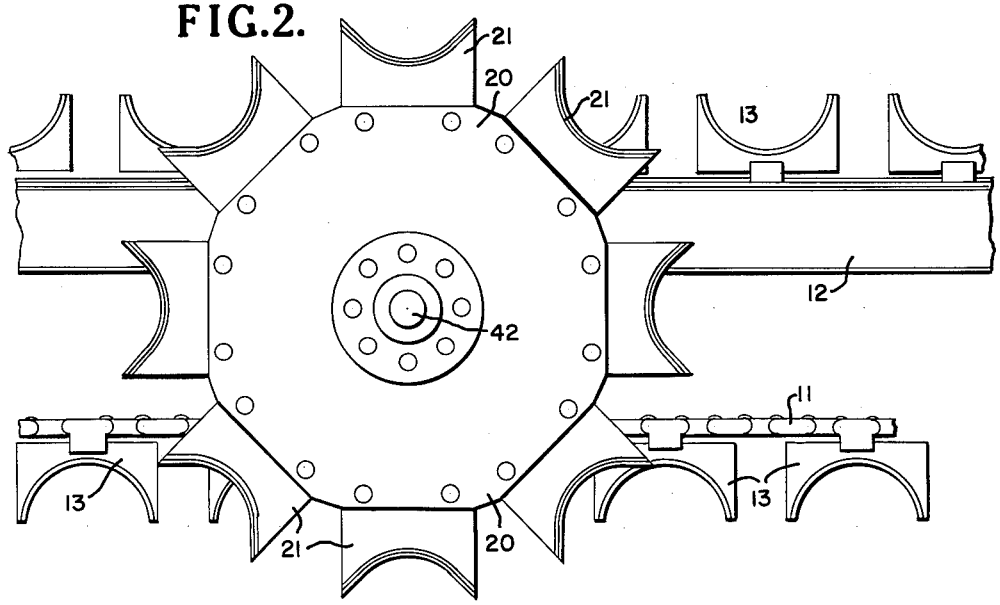
Figure 4:
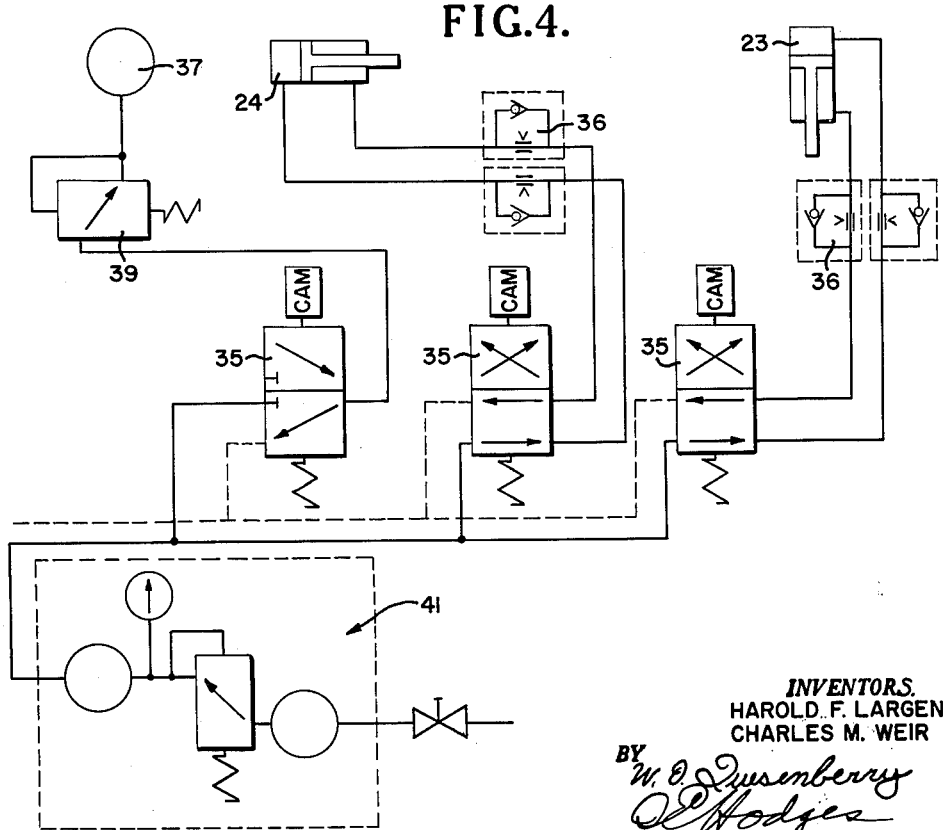

Further objects and the entire scope of the invention will become further apparent in the following detailed description and in the appended claims. The accompanying drawings display the general construction and operational principles of the invention. It is to be understood, however, that the drawings are furnished only by way of illustration and not in limitation thereof, and wherein:

FIG. 1 is a side view of the conveyor and the lid tightening station;
FIG. 2 is a sectional side elevation view disclosing the power train and the star wheel;
FIG. 3 is a sectional view of the Geneva gear utilized by the star wheel; and
FIG. 4 is a one line diagram of the pneumatic system utilized by the conveyor system.

Referring now to the drawings, wherein like reference characters designate like or corresponding parts throughout the several views, there is shown in FIG. 1 the overall conveyor assembly. The conveyor 8 is built on frame 9 and has two endless chains 11 mounted on conveyor-chain tracks 12 approximately 24 inches apart. Each endless chain 11 is the roller type with attachment means for a plurality of tank holders 13 in parallel spaced relation for carrying ammunition tubes 14. The two chains 11 are pulled down the chain tracks 12 by identical sprockets 15 which are connected to a common shaft 16. The shaft 16 is rotated by a chain 17 which in turn is driven by chain 18 which is connected to variable speed drive 19.

In the middle of the conveyor intermediate the two endless chains 11 is an eight-station star wheel 20, more clearly shown in FIG. 2. The star wheel 20 has eight cradles 21 attached thereto for holding the ammunition tubes 14 it lifts off of the conveyor 8. The star wheel 20 is operated by a Geneva gear 22 rotating on shafts 42 and 43 respectively which will be described in more detail hereinafter. The operation of the star wheel 20 is intermittent but synchronized through the Geneva gear 22 with the linear motion of the conveyor. The cradles 21 on the star wheel lift the tubes 14 off of the conveyor cradles and rotate them 45 degrees so that the star wheel cradle and the tube are substantially normal to the conveyor. When the tube reaches the top-most position of the star wheel rotation the pneumatic system of FIG. 4 is energized. The star wheel stops in this position and air cylinder 23 clamps the tube 14 in place. The pneumatic torque wrench 24 advances and rotates the cap 25 tightly on the tube and then retracts. The air cylinder clamp 23 retracts and the star wheel indexes placing the tube back on conveyor 8 in its original position.

As is more clearly shown in FIG. 1 a pair of guiding bars or guides 26 are located above each of the endless chains to help maintain the tube on the star wheel. The guide bars are so located in proximity to the star wheel that the tube will be maintained in position even if it should tilt during the cover tightening operation or while being indexed from one position to another.

FIG. 3 discloses the Geneva gear 22 used to drive the star wheel. The driving member 27 of the Geneva gear 22 is driven at the same speed as the conveyor chains 11. The star wheel is driven at a two-to-one ratio of the main drive through gear trains 27, 28, 29, 30 and 38. The star wheel is in motion as shown in FIG. 3 and will index until element 31 of gear 27 leaves slot 32 of gear 28. At this point the gear train stops and element 33 holds the gears stationary as it turns in the recess of gear 28. The gear train is stationary until element 34 rotates around and enters the next slot 32 of gear 28 again causing the gear train to rotate and the star wheel to index.

The actuation of the cam operated pneumatic directional valves of FIG. 4 is considered well known in the art and therefore a detailed explanation is not considered necessary. The pneumatic system has an air supply unit 41 and utilizes cam-actuated pneumatic directional valves 35 to sequence the pneumatic clamp cylinder and torque wrench movements in synchronization with the star wheel and conveyor. The pneumatic system utilizes limit valves 36 to regulate the travel of the torque wrench slide 24 and tube clamping air cylinder 23. The pneumatic torque motor 37 has a relief valve 39 for adjusting the torque to be used to tighten the covers 25 on the casing 14.

By utilizing applicants' novel invention it is now possible for the production line to operate more smoothly with less personnel. The people on the production line now expend their energy in filling the ammunition cans which move past them at a uniform rate. This obviously will result in a higher quality and quantity output with less fatigue of the operators. By utilizing the novel lid tightening station the lids are torqued into position uniformly and at a rate that is synchronized with the conveyor. Such a feature heretofore was not considered possible.

While pneumatic clamping and torquing arrangements have been described in detail, it is obvious that other means, such as mechanical, electro-mechanical, hydraulic or combinations thereof could be employed to perform the clamping and/or torquing operations and still remain within the scope of the invention.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A cartridge tank conveyor system comprising a frame, said frame having means thereon for tightening covers on a plurality of cartridge tanks and for conveying a plurality of cartridge tanks from a supply station along an assembly line at a uniform speed to a loading station, said means including an endless conveyor having a uniform speed with cradle means for holding each of the cartridge tanks equidistance from adjacent tanks, a star wheel correlated with said conveyor for lifting the cartridge off of the conveyor and indexing it into a clamping position, pneumatic means for tightening a cover on the cartridge tank while the tank is in said clamping position, said star wheel indexing and replacing the cartridge tank back on the conveyor in the original position after the cover has been tightened thereon.

2. A conveyor system comprising conveyor means for moving a procession of articles along a predetermined path of travel in a spaced and timed order, a work station disposed medially thereon in the path of travel of said articles, said work station having a vertical rotary transfer means medially located in said conveyor means for removing the articles off of said conveyor means and into a work position, pneumatic means for performing the work on the articles while in said work position, said rotary means rotating the articles back on said conveyor means in their original position when the work has been performed thereon.

3. In a conveyor system for performing an operation upon successive articles, the combination of a conveyor moving a procession of articles continuously along a predetermined path of travel in spaced and timed order, a work performing station disposed adjacent the path of travel of said articles, a star wheel disposed between said conveyor and said station for engaging and transferring the articles upon arrival from said conveyor into a work position, pneumatic means in said work station for performing work on each of the articles while in the work position, said star wheel thereafter rotating the article back into the original position on said continuously moving conveyor.

4. A cartridge tank conveyor system comprising a frame, said frame having a pair of endless chains mounted thereon which move at a uniform speed along an assembly line, said endless chains having cradles affixed thereto in such a manner as to carry a plurality of cartridge tanks, a work station located vertically adjacent to said endless chains, a rotatable star wheel medially located and correlated with said pair of endless chains, said star wheel having a plurality of cradles affixed thereto in such manner as to remove each cartridge tank from the conveyor upon arrival and rotate the cartridge tank into the vertical work station, first pneumatic means in said work station for clamping the cartridge tank momentarily in a work position, second pneumatic means for tightening a cover on the cartridge tank while in the work position, whereupon said second pneumatic means and said first pneumatic means are removed in the order named and said star wheel indexes to replace the cartridge tank back onto the conveyor cradle from which it was taken.

5. A conveyor system for receiving and moving a plurality of cartridge tanks along an assembly line at a uniform speed to a work position in a work station and returning them to the conveyor in their original location for continued movement therewith comprising a frame, a pair of endless chains mounted on said frame, drive means for moving said chains at a constant rate, cradle means suitably attached to said endless chains for holding a plurality of cartridge tanks equidistant from each other, a work station located vertically adjacent to said endless chains, a star wheel medially located with respect to said endless chains and correlated thereto for removing the cartridge tanks from their cradles into a work position in said work station, said star wheel having an intermittent rotary motion thereby allowing a dwell time while in the work position, pneumatic means in said work station for performing work on each of the cartridges during the dwell time, said star wheel thereafter indexing the cartridge back into its original cradle on the continuously moving conveyor.

6. A conveyor system for receiving and moving a plurality of cartridge tanks along an assembly line through a work station, then back to the conveyor and a loading ramp at a uniform speed comprising a conveyor means for holding a plurality of cartridge tanks equidistant from each other and moving them along an assembly line at a constant speed, a work station located vertically adjacent to said conveyor means, wheel means located between said conveyor means and said work station for removing the cartridge tanks from the conveyor means upon arrival into said work station, said wheel means having an intermittent motion correlated with said conveyor means for providing a dwell time for the cartridge while it is in the work station, means in said work station for performing work on each cartridge during the dwell time, said wheel means thereafter indexing the cartridge back into its original position on said conveyor means.

References Cited in the file of this patent

UNITED STATES PATENTS

| | | |
|---|---|---|
| 1,470,348 | Clark | Oct. 9, 1923 |
| 2,341,498 | Bell | Feb. 8, 1944 |
| 2,884,751 | Bjering | May 5, 1959 |